July 17, 1928.
H. E. DERR, SR
1,677,514
SELF ALIGNING BEARING FOR SHAFTS
Original Filed Sept. 28, 1923
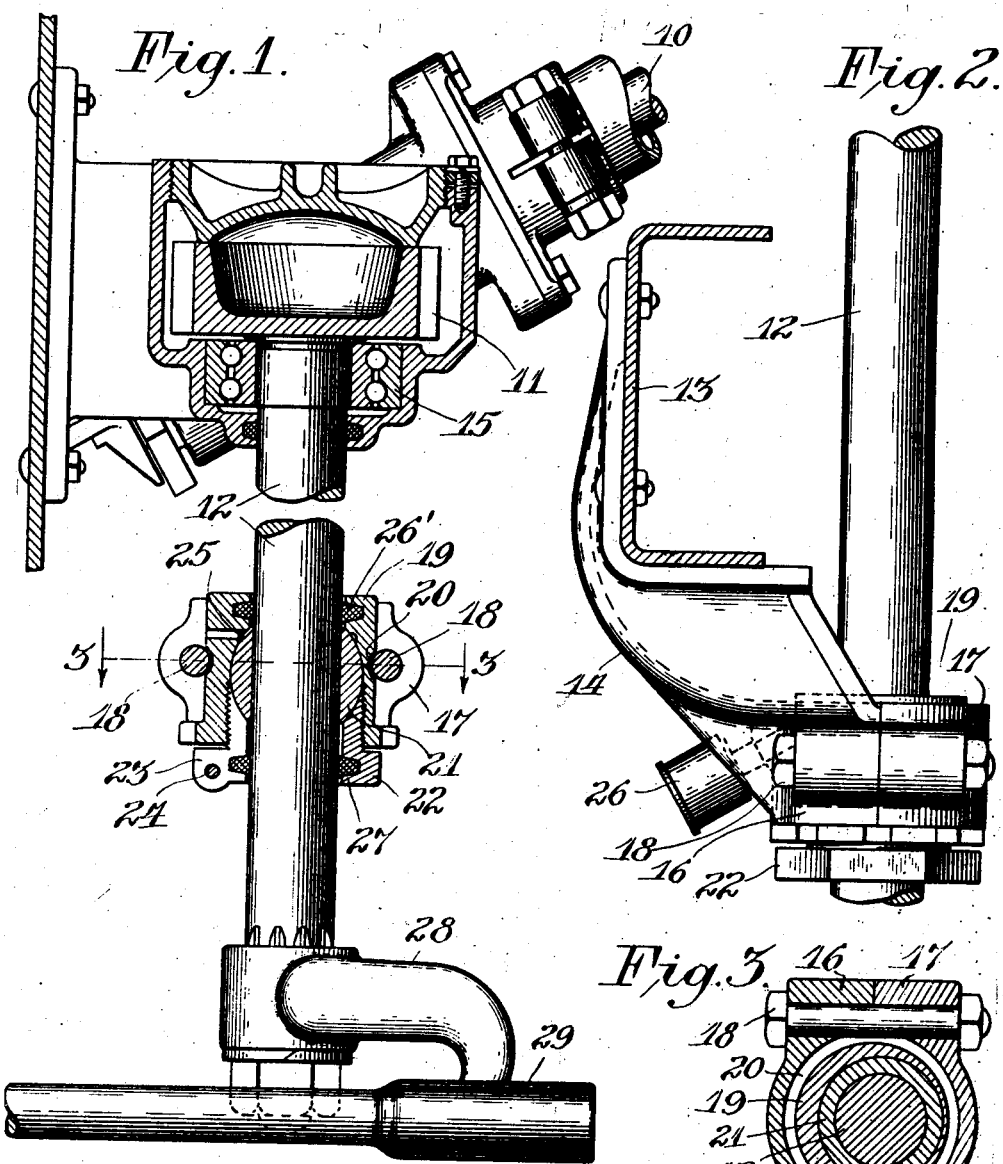
Inventor.
Harry E. Derr, Sr.,
By [signature]
Atty.

Patented July 17, 1928.

1,677,514

UNITED STATES PATENT OFFICE.

HARRY E. DERR, SR., OF NEW YORK, N. Y., ASSIGNOR TO INTERNATIONAL HARVESTER COMPANY, A CORPORATION OF NEW JERSEY.

SELF-ALIGNING BEARING FOR SHAFTS.

Original application filed September 28, 1923, Serial No. 665,270. Divided and this application filed January 12, 1925. Serial No. 1,766.

This invention relates generally to bearings of the self-aligning type and particularly to a bearing particularly useful in connection with the improved steering mechanism for motor propelled vehicles disclosed and claimed in applicant's co-pending application Serial No. 665,270, filed September 28, 1923, of which this application is a division.

A general object of this invention is to provide a simple and efficient bearing for shafts, where flexibility and self-alignment of the shaft are essential to its efficient performance.

Another object is to provide an improved bearing member for shafts such as the steering shaft disclosed in applicant's parent application, above identified, such bearing forming an intermediate support for absorbing road shocks and also acting automatically to keep the shaft in alignment.

The construction and operation of this improved bearing will be made clear by reference to the preferred embodiment thereof disclosed in the accompanying specification and the sheet of drawings, wherein like characters of reference refer to like parts throughout the several views and wherein,—

Fig. 1 is a side elevational view showing a fragment of the improved steering gear disclosed in the parent application and a sectional view of the improved bearing in association with the shaft thereof;

Fig. 2 is a detail view showing the bearing and its support maintaining the shaft in its vertical position;

Fig. 3 is a detail sectional view of a shaft and bearing taken along the line 3—3 of Fig. 1 looking in the direction of the arrows; and Fig. 4 is a detail bottom, plan view of the cap of the stud of the bearing assembly and showing an adjustment feature.

As already stated this bearing is particularly useful when used in connection with the steering shaft of the improved steering mechanism disclosed in the above identified parent application. Briefly, this improved steering gear comprises a two-part steering shaft arranged in such a manner that the operator of the vehicle has a more perfect and comfortable command of the steering control when operating his vehicle. The steering control comprises the shaft 10 geared by means of a worm, not shown, to a pinion 11 keyed to the steering shaft 12 angularly disposed with respect to the steering control shaft 10. The frame member 13 of the motor vehicle is provided with a depending bracket 14 which carries and supports the improved bearing to be presently described. The shaft 12 is slidably supported in this improved bearing carried by the bracket 14, as just stated. The function of this bearing is properly to align the shaft 12 with respect to a bearing 15 at the upper end of the shaft and also to provide a point intermediately of the ends of the shaft for absorbing road shocks and giving that necessary flexibility to the shaft necessitated by the vibration of the vehicle when in operation.

The bracket 14, as stated, is suitably fixed to the vehicle frame 13 and comprises a two-part support 16 and 17. These supporting members are each semicircular in form and are securely bolted together by bolts 18 thereby providing a cup-shaped recess for the reception of an annular cup-like socket member 19, the bolts 18 extending along opposite sides of the shaft 12 and tangentially and loosely engaging an annular groove 20 formed on the outer wall of the socket member 19. The shaft 12, it will be observed, slidably carries a concentric ball 21, which in turn is mounted for universal movement in the socket member 19. For the purpose of preventing displacement of the ball, a suitable stud member 22 surrounds the shaft 12 and is threaded into the socket, thereby hoding the ball in place and closing the socket. It will be observed, as shown in Fig. 4, that this stud is split and that the cap thereof, as shown in Fig. 4 is provided with bosses 23 which receive an adjusting screw 24 whereby the stud may be expanded to form an expanding bind and more securely maintain the threaded engagement of the stud with the socket.

It has already been stated that the ball is concentrically arranged on the shaft 12. It should be further noted that the socket member 19 is eccentrically arranged around this ball member. Thus, in assembling the bearing with the shaft, there is a tendency of self-alignment of the shaft 12 with respect to the bearing 15 at its upper end. It should be understood that the eccentric feature just described serves merely as an aid to proper alignment of the shaft, as explained, and, when once assembled, the parts are securely locked in place by bolts 18 for preventing rotative movement of the bearing with respect to the shaft. By means of an oil groove 25 and a grease cup 26 communicating therewith, a lubricant may be forced into the socket for lubricating the ball and shaft. Packing rings 26' and 27 are provided for the purpose of sealing the lubricant in the socket and keeping out dust particles, because, as will be noted, the socket and stud members do not closely fit the shaft, which of necessity must be so to permit the required flexibility. At the lower end of the shaft is fastened the conventional pitman 28 and steering link 29 for transmitting the steering movements of the steering shaft.

As already explained, the preferred embodiment of the invention has been shown and this invention is not necessarily limited to a bearing for use only with steering shafts, for obviously this bearing would be useful in connection with many other kinds of shafts.

It is to be understood that various changes in the form, construction and arrangement of parts may be made by those skilled in the art without departing from the spirit of the invention as hereinafter claimed.

What is claimed is:

1. The combination of a steering shaft and a bearing therefor carried intermediate its ends and supported in a bracket mounted on the vehicle frame, said bearing comprising a concentric ball through which said shaft is slidable, an eccentric socket member housing said ball, a stud member threaded into said socket member for preventing dislodgment of said ball, and means cooperating with the bracket and socket member for preventing rotative movement of the socket member.

2. The combination of a shaft and a bearing therefor carried intermediate its ends and adapted to be supported in a bracket mounted on a frame, said bearing comprising a concentric ball through which said shaft is slidable, an eccentric socket member housing said ball, a stud member adjustably fitted into said socket member for preventing dislodgment of said ball, an annular groove in said socket member, and bolts carried by said bracket and engaging said groove for supporting said socket member.

3. The combination with a frame, of a shaft and bearing therefor, said bearing comprising a socket, a concentric ball mounted for universal movement in the socket and slidably receiving the shaft, a stud for closing the socket and holding the ball in place, said socket being eccentrically disposed around the ball, and means carried by the frame loosely engaging the socket for supporting and preventing axial movement of the bearing with respect to said shaft.

In testimony whereof I affix my signature.

HARRY E. DERR, Sr.